(12) United States Patent
Yankilevich

(10) Patent No.: US 7,869,500 B2
(45) Date of Patent: Jan. 11, 2011

(54) VIDEO ENCODER AND METHOD FOR DETECTING AND ENCODING NOISE

(75) Inventor: Itzik Yankilevich, Tel-Aviv (IL)

(73) Assignee: Broadcom Corporation, Irvine, CA (US)

( * ) Notice: Subject to any disclaimer, the term of this patent is extended or adjusted under 35 U.S.C. 154(b) by 1561 days.

(21) Appl. No.: 10/873,486

(22) Filed: Jun. 23, 2004

(65) Prior Publication Data

US 2005/0238239 A1    Oct. 27, 2005

Related U.S. Application Data

(60) Provisional application No. 60/565,535, filed on Apr. 27, 2004.

(51) Int. Cl.
*H04N 7/12* (2006.01)
*H04N 11/02* (2006.01)

(52) U.S. Cl. .............................. 375/240.01; 375/240.26

(58) Field of Classification Search .................................
375/240.01–240.06, 240.12–240.16, 240.26
See application file for complete search history.

(56) References Cited

U.S. PATENT DOCUMENTS

| | | | | |
|---|---|---|---|---|
| 4,963,030 A | * | 10/1990 | Makur | 375/240.22 |
| 5,214,507 A | | 5/1993 | Aravind et al. | |
| 5,353,061 A | * | 10/1994 | Rodriguez et al. | 375/240.12 |
| 5,359,676 A | | 10/1994 | Fan | |
| 5,377,018 A | | 12/1994 | Rafferty | |
| 5,684,714 A | * | 11/1997 | Yogeshwar et al. | 370/521 |
| 5,844,627 A | | 12/1998 | May et al. | |
| 6,005,626 A | * | 12/1999 | Ding | 375/240.16 |
| 6,224,640 B1 | | 5/2001 | Tucholski | |

(Continued)

FOREIGN PATENT DOCUMENTS

CN    1268842    10/2000

(Continued)

OTHER PUBLICATIONS

Song, B.C. and Chun, K.W., "Motion-Compensated Noise Estimation for Efficient Pre-Filtering in A Video Encoder," *Proceedings 2003 International Conference on Image Processing, ICIP-2003*, Barcelona, Spain, Sep. 14-17, 2003, vol. 2 of 3, pp. 211-214.

(Continued)

*Primary Examiner*—David Czekaj
(74) *Attorney, Agent, or Firm*—Sterne, Kessler, Goldstein & Fox P.L.L.C.

(57) ABSTRACT

A digital video signal encoder and method for detecting and encoding noise is disclosed. In a frame in a video signal, the variance of at least four macroblock luminance blocks is calculated. The Log2 of the minimum of these variances is determined. A running sum of the Log2 calculations is calculated and compared to a noise threshold to determine whether or not the frame contains noise. In one embodiment, a frame is determined to contain noise if the running sum is greater than a noise threshold and encodes the remaining portion of the frame as noise. In another embodiment, a current frame is determined to contain noise and is encoded as noise if the previous frame contained noise. The present invention may encode noise by overriding the original bit rate quantiser scale and/or removing at least one high frequency from a noise block using a DCT filter.

32 Claims, 6 Drawing Sheets

U.S. PATENT DOCUMENTS

| | | | |
|---|---|---|---|
| 6,259,819 B1 | 7/2001 | Andrew et al. | |
| 6,285,710 B1 * | 9/2001 | Hurst, Jr. et al. | 375/240.12 |
| 6,459,735 B1 * | 10/2002 | Suito et al. | 375/240.15 |
| 6,634,649 B1 | 10/2003 | Yamaguchi et al. | |
| 6,748,113 B1 | 6/2004 | Kondo et al. | |
| 6,834,080 B1 * | 12/2004 | Furukawa et al. | 375/240.02 |
| 7,023,914 B2 * | 4/2006 | Furukawa et al. | 375/240.02 |
| 7,072,396 B2 * | 7/2006 | Wang | 375/240.12 |
| 7,194,030 B2 * | 3/2007 | Xiong et al. | 375/240.02 |
| 7,453,938 B2 * | 11/2008 | Haskell et al. | 375/240.03 |
| 2002/0024999 A1 | 2/2002 | Yamaguchi et al. | |
| 2004/0029002 A1 | 2/2004 | Sargeant et al. | |
| 2004/0151243 A1 | 8/2004 | Bhaskaran et al. | |
| 2005/0129330 A1 | 6/2005 | Shyshkin | |
| 2005/0265446 A1 | 12/2005 | Yankilevich | |
| 2007/0286501 A1 * | 12/2007 | Sato et al. | 382/233 |

FOREIGN PATENT DOCUMENTS

| | | |
|---|---|---|
| CN | 1286575 A | 3/2001 |
| EP | 1039760 | 9/2000 |
| EP | 1 250 012 | 10/2002 |

OTHER PUBLICATIONS

Song, B.C. and Chun, K.W., "Motion-compensated temporal filtering for denoising in video encoder," *Electronics Letters*, Jun. 24, 2004, vol. 40, No. 13, pp. 802-804.

Search Report, for European Appln. No. 05009150.3, 3 pages, dated Sep. 27, 2005.

* cited by examiner

600

VIDEO ENCODER AND METHOD FOR DETECTING AND ENCODING NOISE

CROSS-REFERENCE TO RELATED APPLICATIONS

This application claims priority from U.S. provisional application No. 60/565,535 filed on Apr. 27, 2004, and titled "Video Encoder And Method For Detecting And Encoding Noise" which is incorporated by reference herein in its entirety.

BACKGROUND OF THE INVENTION

1. Field of the Invention

The present invention relates generally to video compression, and more specifically to a digital video encoder system and method for detecting and encoding noise.

2. Related Art

Digital video products and services and devices for storage and retrieval of video streams on the Internet are ubiquitous in the marketplace. Due to limitations in digital signal storage capacity and limitations in network and broadcast bandwidth, compression of digital video signals is essential to digital video storage and transmission. As a result, many standards for compression and encoding of digital video signals have been promulgated. These standards specify with particularity the form of encoded digital video signals and how such signals are to be decoded for presentation to a viewer.

One example of such a standard is the ISO/IEC international Standard 13818 (generally referred to as MPEG-2 format) created by the Moving Picture Experts Group (MPEG) and is described in ITU-T Recommendation H.262, ISO/IEC 13818-2: 1996 Information technology—Generic coding of moving pictures and associated audio—Part 2: Video, which document is incorporated herein by reference in its entirety. Although the MPEG-2 standard specifies a general coding methodology and syntax for generating an MPEG-2 compliant bitstream, many variations are permitted to accommodate a plurality of different applications and services such as desktop video publishing, video conferencing, digital storage media, and television broadcast. Thus, MPEG-2 allows significant discretion as to how the digital video signals are to be transformed from a native, uncompressed format to the specified encoded format. In other words, encoding steps are not rigidly defined allowing tradeoffs between video quality, compression ratio, and compute power of the encoder. As a result, many different digital video signal encoders currently exist and many approaches are used to encode digital video signals.

Referring now to FIG. 1, there is shown one example of a prior art video encoder 10. Prior art video encoder 10 operates in accordance with MPEG-2 video compression standards. Video encoder 10 includes a video input processor 12, a motion estimation processor 14, a digital signal processor 16, and a bitstream processor 18.

Video input processor 12 captures a video signal, which contains a current frame, or a plurality of current frames, to be encoded, and processes and transfers them to external pre-encoding memory unit 20. External pre-encoding memory unit 20 implements an input buffer frame (not shown) which accumulates and re-orders the frames according to the standard required for the MPEG compression scheme.

External pre-encoding memory unit 20 transfers the current frames to motion estimation processor 14. External reference memory unit 22 also transfers reference frames which have already been encoded to motion estimation processor 14. Motion estimation processor 14 reads and compares both sets of frames, analyzes the motion of the video signal and transfers the motion analysis to digital signal processor 16.

Digital signal processor 16 receives the current frames from the external pre-encoding memory 20, and according to the motion analysis received from motion estimation processor 14, processes and compresses the video signal. Digital signal processor 16 then transfers the compressed data to the bitstream processor 18. Digital signal processor 16 further reconstructs the reference frame and stores it in reference memory 22.

Bitstream processor 18 encodes the compressed data and transfers an encoded video bitstream to external post-encoding memory unit 24. External post-encoding memory unit 24 implements an output buffer (not shown) which stores the encoded video bitstream before it is transferred out of the encoder 10 to a target device.

During operation of an encoder, it is inevitable that some noise is presented to the input of the encoder. For example, when a TV is used as a source for the encoder, a temporal noise appears on the TV screen when the TV channel is switched. Such noise includes very high frequencies in the spatial domain. Encoding very high frequencies with MPEG-2 requires a very high (peak) bit rate. A very high or peak bit rate causes the output buffer to overflow which in turn causes the encoder to stop functioning. Therefore, what is needed is a system and method for detecting noise to avoid or reduce this peak bit rate and maintain a reasonable bit rate in order to prevent the encoder from halting.

One possible solution would be to eliminate these very high frequencies before encoding the noise. However, the problem with this solution is that there are many video sources with high frequencies. Eliminating high frequencies of certain video sources reduces image quality. Therefore, what is needed is a system and method for detecting and distinguishing noise from a video source with high frequencies before encoding it.

Additionally, many MPEG-2 encoding applications are real-time. In other words, after one macroblock is encoded, the next macroblock must be processed. It is not possible to analyze the whole frame before encoding it. Therefore, it is also desirable to have a system and method for detecting and encoding noise in a single pass.

Further limitations and disadvantages of conventional and traditional approaches will become apparent to one of skill in the art through comparison of such systems with the present invention as set forth in the remainder of the present application and with reference to the drawings.

SUMMARY OF THE INVENTION

According to the present invention, these objects are achieved by a system and method as defined in the claims. The dependent claims define advantageous and preferred embodiments of the present invention.

A system and method for detecting and encoding noise detects noise in a frame by calculating the variance of at least one macroblock luminance block, calculating the minimum of the variances, calculating the Log2 of the minimum of these results, calculating a running sum of the Log2 calculations, and comparing the running sum to a noise threshold. If the running sum is greater than a noise threshold, then the current frame is assumed to contain noise. The system and method may also assume that a current frame contains noise if the previous frame contained noise.

If a current frame contains noise, then the noise in the frame may be encoded by using a high quantiser scale that achieves the target of reducing the peak bit rate. In one embodiment, if the current frame contains noise, then the noise in the frame is encoded by using the maximum value in a given quantiser scale table, such as quantiser_scale=112. The frame may also be encoded by removing at least one high DCT frequency from a noise block by using a DCT filter.

Thus, the system and method of the present invention advantageously handle and encode noise as soon as possible and enable the invention to reduce the peak bit rate to prevent buffer overflows and to prevent encoder hardware from halting. The present invention also advantageously detects noise within one frame of time during a single pass.

These and other advantages, aspects and novel features of the present invention, as well as details of an illustrated embodiment thereof, will be more fully understood from the following description and drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes or steps have not been described in detail in order not to unnecessarily obscure the present invention.

Embodiments of the invention are discussed below with references to FIGS. 2 to 7. However, those skilled in the art will readily appreciate that the detailed description given herein with respect to these figures is for explanatory purposes as the invention extends beyond these limited embodiments.

Figure 1:
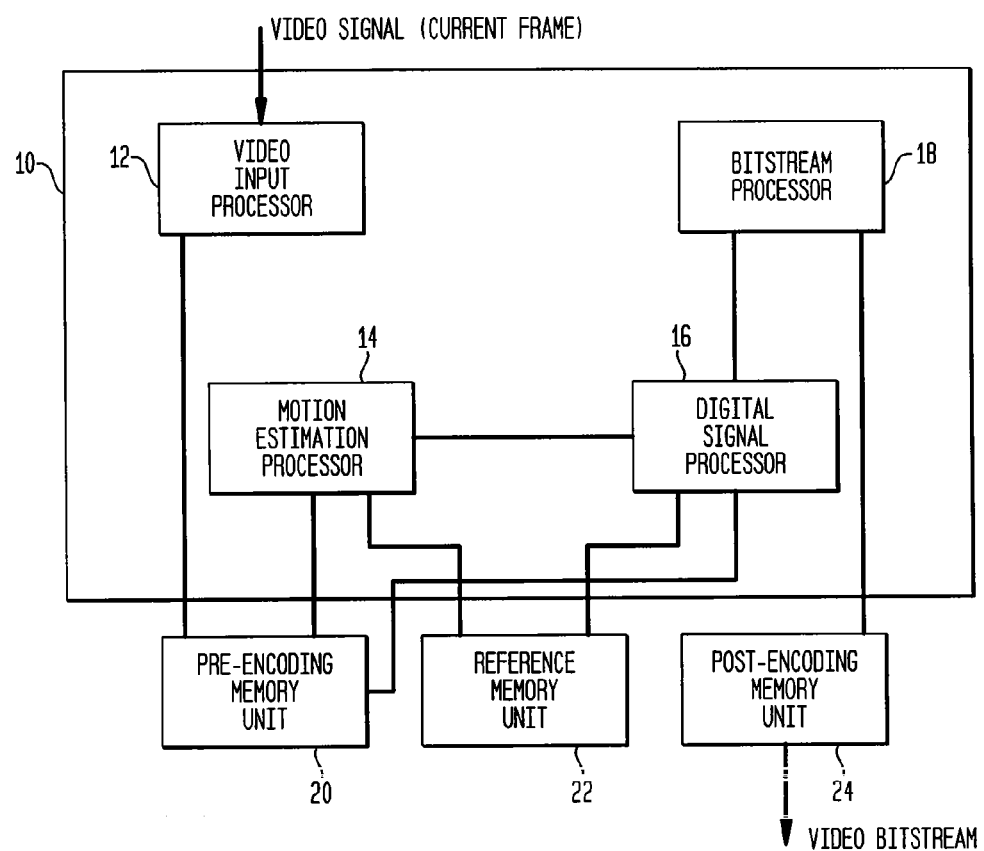
FIG. 1 is a block diagram of a prior art video encoder.
Figure 2:
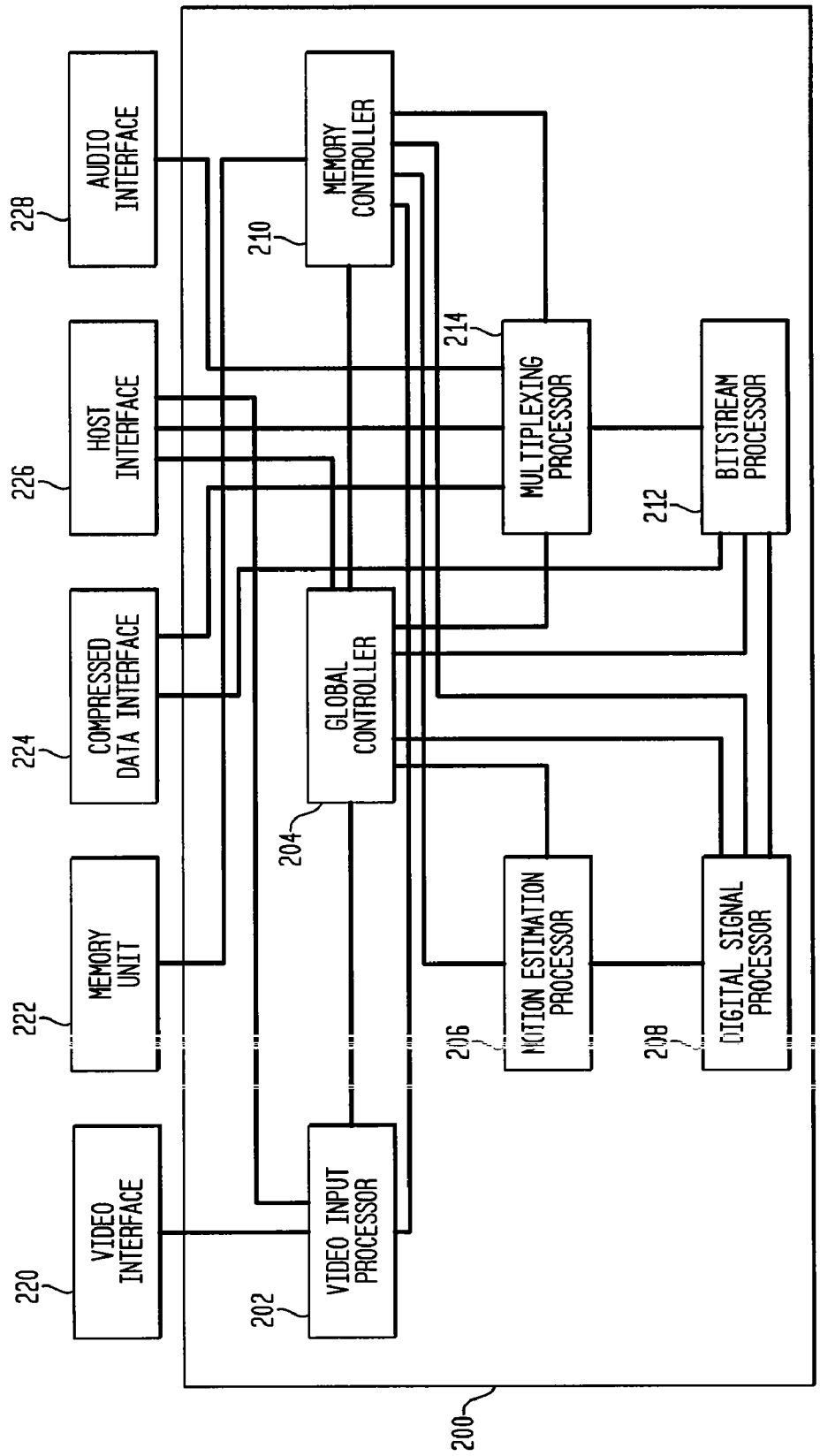
FIG. 2 is a block diagram of a video encoder constructed and operative in accordance with a preferred embodiment of the invention.

Referring now to FIG. 2, there is shown a block diagram of one embodiment of a video encoding system 200 constructed and operative in accordance with a preferred embodiment of the invention. Video encoder 200 is a parallel digital processor, such as the BCM7040 Single Channel MPEG encoder or the BCM7041 Dual Channel MPEG encoder produced by Broadcom Corporation of Irvine, Calif., designed for the purposes of real-time video/audio compression and multiplexing, such as for MPEG encoding and the like. Encoder 200 can be incorporated in a single chip and installed in digital camcorders, recordable digital video disk (DVD), game machines, desktop multimedia, video broadcast equipment, video authoring systems, video streaming and video conferencing equipment, security and surveillance systems, and the like. The present invention overcomes the disadvantage of the prior art by providing a novel approach to video/audio compression and encoding, and, as per this approach, a novel method for detecting and encoding noise.

Encoder 200 includes a video input processor 202, a global controller 204, a motion estimation processor 206, a digital signal processor 208, a memory controller 210, a bitstream processor 212 and a multiplexing processor 214. Encoder 200 is preferably connectable to a video interface 220, an external memory unit 222, a compressed data interface 224, a host interface 226, and an audio interface 228. Typically video interface 220 supplies a digital video signal and audio interface 228 supplies a digital audio signal.

Host interface 226 is typically connected to an external host (not shown) and acts as a user interface between encoder 200 and the user. Host interface 226 provides to encoder 200 microcodes, commands, data parameters and the like received from a user or a supervising system. Host interface 226 also provides information received from encoder 200 to the user. Host interface 226 provides access to the compressed data and is used to provide encoder 200 with uncompressed digitized video and/or audio and/or user data.

In a preferred embodiment of the present invention, encoder 200 is operable either in a programming mode or an operational mode, and is capable of operating in both modes simultaneously.

In the programming mode, an external host transfers, via host interface 226, microcodes, commands and data parameters to global controller 204. Global controller 204 transfers the microcodes, commands and data parameters to video input processor 202, motion estimation processor 206, digital signal processor 208, memory controller 210, bitstream processor 212 and multiplexing processor 214.

In the operational mode, video input processor 202 captures a motion video signal, via video interface 220, from an external video source (not shown). In an alternative embodiment processor 202 captures a motion video signal, via host interface 226.

Video input processor 202 then performs statistical analysis of the video signal, thereby detecting 3-2 pulled up sequences and developments in the video contents, such as scene change, sudden motion, fade in/fade out and the like. Video input processor 202 also performs resolution downscaling thereby allowing, or enabling compression not only of the original resolution frames, but also reduced resolution frames (such as SIF, half D1 etc.). Additionally, video input processor 202 also pre-processes the video signal, such as spatial filtering, noise reduction, image enhancement and the like. Furthermore, video input processor 202 decreases the frame rate by decimating (dropping) frames thus allowing flexible rate control. Since device 200 is operable in "feed forward" manner, in order to perform the statistical analysis, a video feedback from the memory unit 222 is implementable. Such feedback allows interframe (picture to picture) analysis.

Video input processor 202 accumulates the scaled and processed video data and transfers the data in bursts to memory unit 222, via memory controller 210. Memory controller 210 stores them in memory unit 222.

In a preferred embodiment, encoder 200 operates under MPEG video/audio compression standards. Hence, a data block represents a macroblock, which is a sixteen by sixteen matrix of luminance pixels and two, four or eight, eight by eight matrices of chrominance pixels as defined by MPEG standards. For purposes of clarity herein, reference to a previous frame refers to a frame that has already been encoded, reconstructed and stored in memory unit 212, and which is compared to the current frame.

The memory controller 210 retrieves a current frame macroblock, and certain parts of the reference frames (referred hereto as search area) from memory unit 222 and loads them into motion estimation processor 206. Motion estimation processor 206 compares the current frame macroblock with the respective reference search area in accordance with a sequence of compression commands, thereby producing an estimation of the motion of the current frame macroblock. This estimation is used to remove temporal redundancy from the video signal.

Motion estimation processor 206 transfers the resulting motion estimation to global controller 204. Motion estimation processor 206 also transfers the current frame macroblock and the corresponding reference frames macroblocks to digital signal processor 208.

Digital signal processor 208 determines whether a frame contains noise and encodes part of the frame and/or the next frame accordingly. For example, digital signal processor 208 may assume that the current frame contains noise if the previous frame contained noise. Details regarding detecting and encoding noise are described more fully with reference to FIGS. 3 to 7. Additionaly, digital signal processor 208 also performs other series of macroblock processing operations intended to remove the spatial redundancy of the video signal, such as discrete cosine transform, macroblock type selection, quantization, rate control and the like. Digital signal processor 208 transfers the compressed data to the bitstream processor 212. Digital signal processor 208 further processes the compressed frame, thus reconstructing the reference frames, and transfers the reconstructed reference frames to memory unit 222 via memory controller 210, thereby overwriting some of the existing reference frames.

Bitstream processor 212 encodes the compressed video data into a standard MPEG format, in accordance with a sequence of known in the art encoding commands. The encoded video data stream is then transfered to compressed data interface 224 via multiplexing processor 214. It will be noted that the compression data interface 224 is connectable to any data receptacle element, such as a storage unit, a transmission line, a computer bus or the like.

According to one embodiment of the present invention, multiplexing processor 214 captures, via host interface 226, digitized audio and/or user data from an external audio/data source (not shown). According to an alternative embodiment of the present invention, multiplexing processor 214 captures the digitized audio via audio interface 228.

Multiplexing processor 214 multiplexes the encoded video and the digitized audio and/or user data streams (as received from bitstream processor 212) and generates, according to a sequence of optimized multiplexing commands, MPEG standard format streams such as packetized elementary stream, program stream, transport stream and the like. Multiplexing processor 214 transfers the multiplexed video/audio/data streams to compressed data interface 224. Multiplexing processor 214 also transfers the multiplexed video/audio/data streams to host interface 226.

Global controller 204 controls and schedules the video input processor 202, the motion estimation processor 206, the digital signal processor 208, the memory controller 210, the bitstream processor 212 and the multiplexing processor 214.

Figure 3:
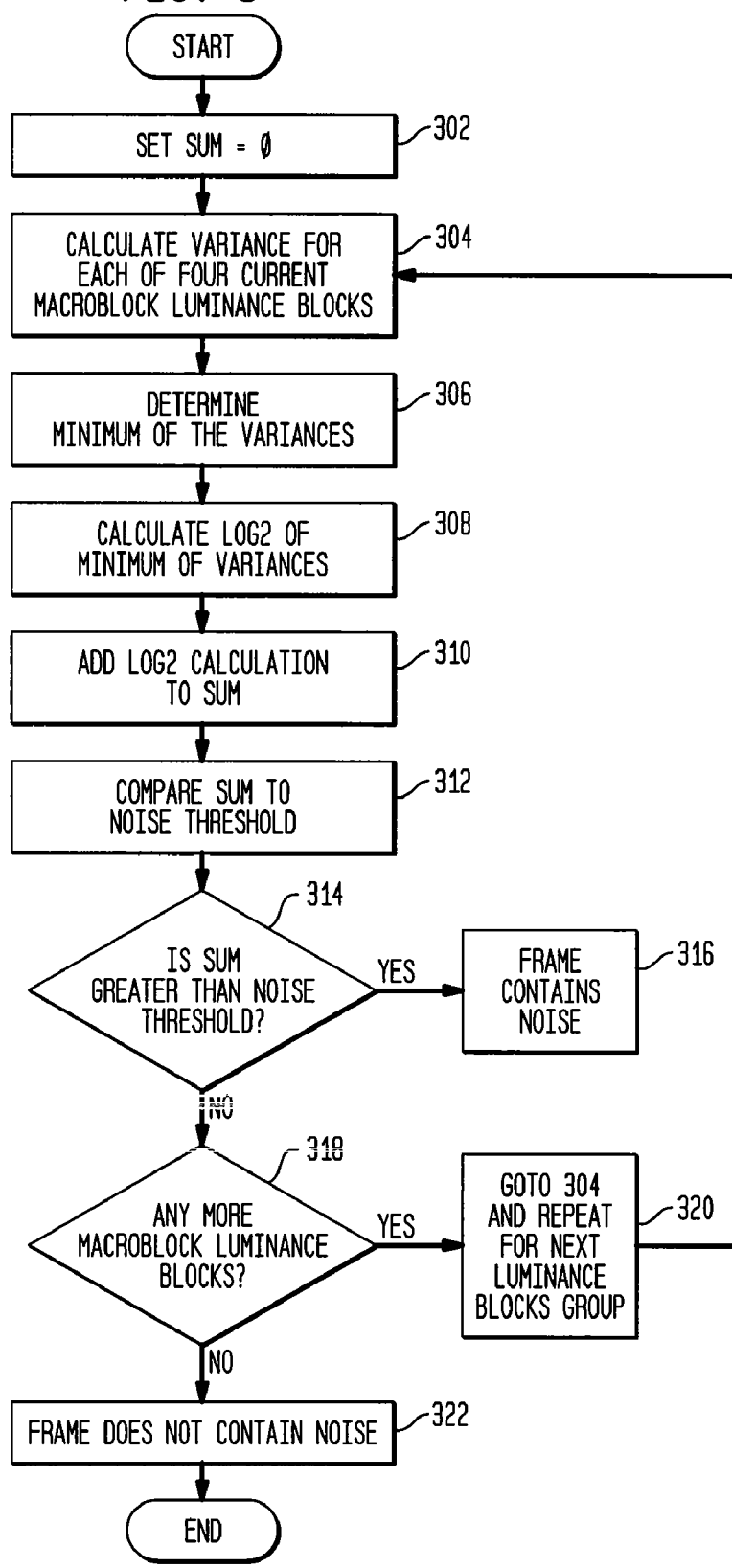
FIG. 3 is a flow chart of a method for detecting noise in accordance with one embodiment of the present invention.

Referring now to FIG. 3, there is shown a flow chart illustrating one embodiment of a method for determining whether or not a current frame contains noise. The present invention compares the running sum with the noise threshold after each calculation of the Log2 of the minimum of the variances. More specifically, at step 302, a variable called SUM is set to zero. The variable SUM will comprise a running sum of the Log2 calculations of the minimum of the variances for the macroblock luminance blocks in a current frame. For each macroblock in the current frame, the variance of each of the four current macroblock luminance blocks is calculated at step 304. At step 306, the minimum of these variances is determined. The Log2 of the minimum of these four results is then calculated at step 308. The result is then added to SUM at step 310. This SUM is then compared to a noise threshold at step 314. If the SUM is greater than the noise threshold, then the frame is determined to contain noise at step 316. If the SUM is less than the noise threshold, then the method determines at step 318 whether there are any remaining macroblocks in the current frame. If there are any remaining macroblocks in the current frame, then steps 304 through 318 are repeated for the next group of macroblock luminance blocks in the current frame. If there are no remaining macroblocks in the current frame, then the frame is determined not to contain noise at step 322. Thus, the present invention advantageously detects noise within a frame during a single pass.

Figure 4:
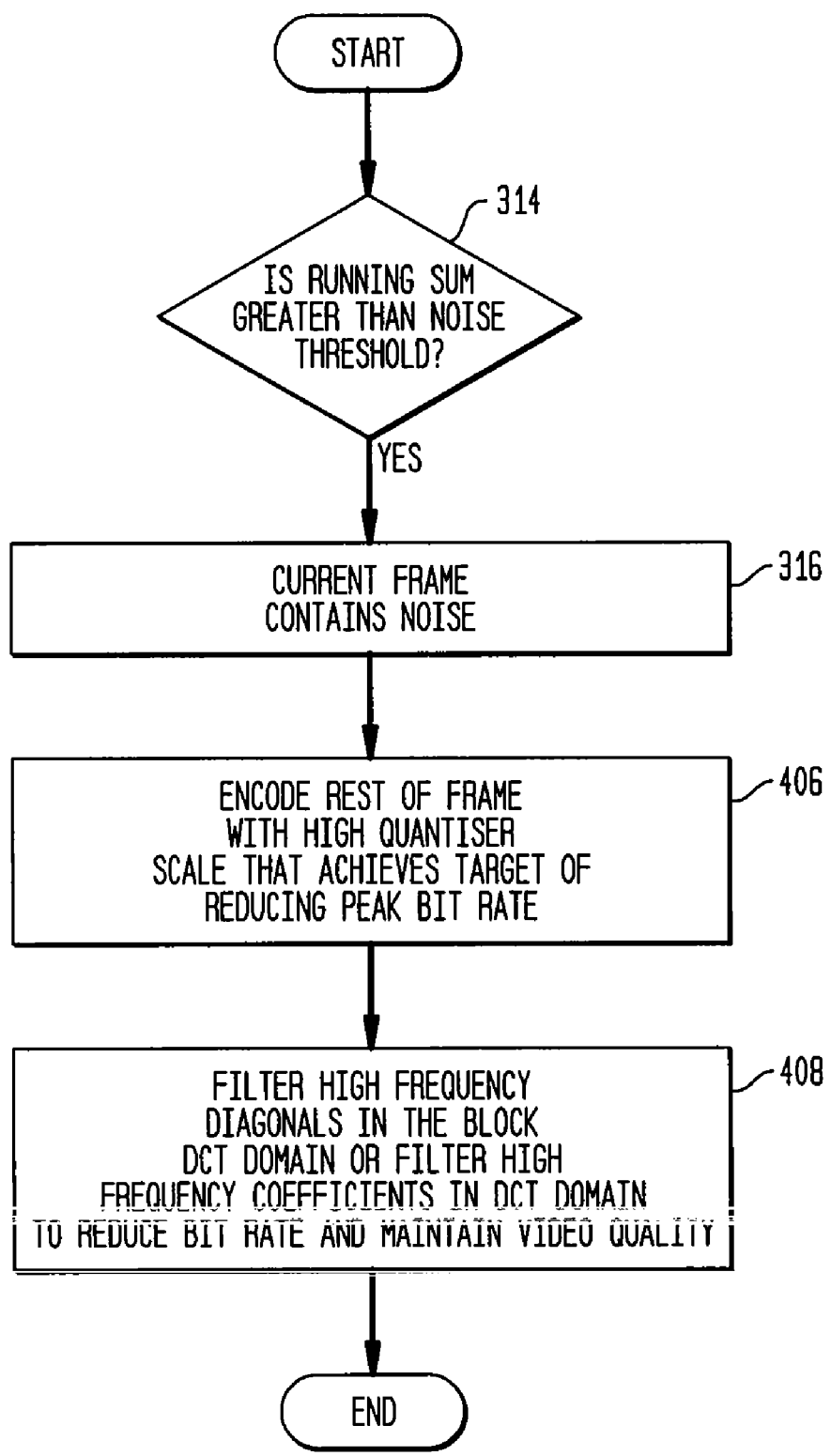
FIG. 4 is a flow chart of one embodiment of a method for encoding noise if the running sum is greater than the noise threshold in accordance with the present invention.

Referring now to FIG. 4, there is shown a flow chart illustrating one embodiment of a method for encoding noise in accordance with the present invention if the running sum is greater than the noise threshold. The method illustrated in FIG. 4 encodes the remaining portion of a current frame as noise, if the beginning of the current frame contains noise. As described above with reference to FIG. 3, if the running sum calculated is greater than the noise threshold (step 314), then the current frame contains noise (step 316). In this embodiment, the remainder of the frame will be encoded as noise. The noise in the frame may be encoded by using a high quantiser scale that achieves the target of reducing the peak bit rate. In one embodiment, the noise in the remainder of the frame is encoded with the maximum quantiser scale value at step 406 to reduce the bit rate to a minimum. In a preferred embodiment, the present invention operates in accordance with the MPEG-2 standard and uses quantiser_scale=112 (quantiser_scale_code=31). Additionally, the high frequency diagonals in the block DCT domain may be filtered and only a predetermined number of consequent low frequency diagonals may be retained. In a preferred embodiment, only the first three (3) diagonals in the block DCT domain are retained while the rest are set to zero. The present invention is not limited to the number of diagonals which are retained in the block DCT domain, and one skilled in the art will realize that any number of consequent low frequency diagonals may be retained as long as the bit rate is reasonable and the number of consequent low frequency diagonals retained does not halt the encoder. One skilled in the art will also realize that the present invention is not limited only to filtering diagonals in the DCT domain, but that the principles of the present invention apply to any method for reducing the bit rate and maintaining a reasonable video quality. For example, the high frequency coefficients in the DCT domain may be filtered in any way that reduces the bit rate and maintains a reasonable video quality. Thus, the present invention advantageously handles and encodes noise immediately as soon as the running sum detects noise in a frame and enables the invention to reduce the peak bit rate and prevent encoder halting as soon as possible.

Figure 5:
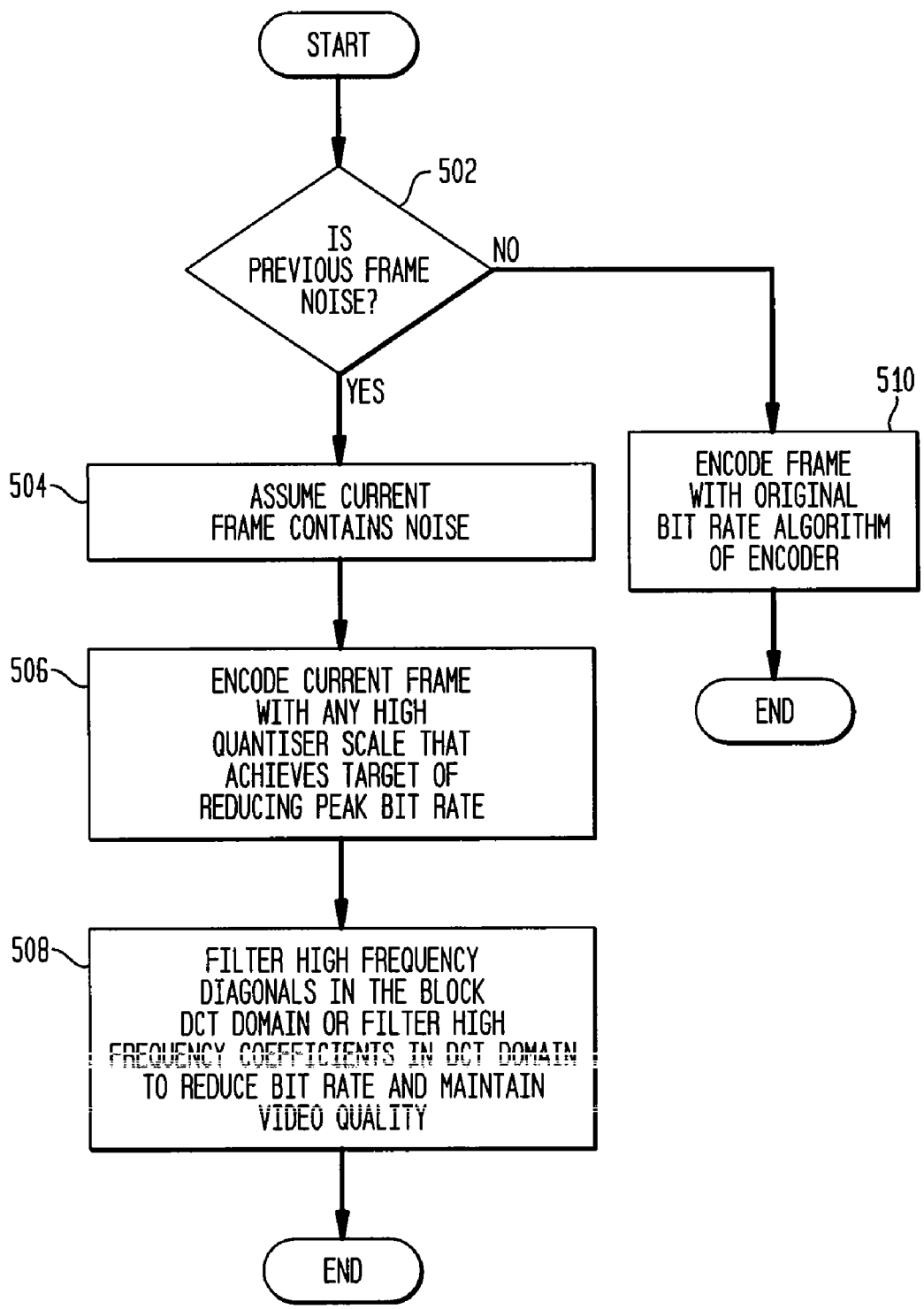
FIG. 5 is a flow chart of a method for encoding noise if the previous frame contained noise in accordance with the present invention.
Figures 6, 7:
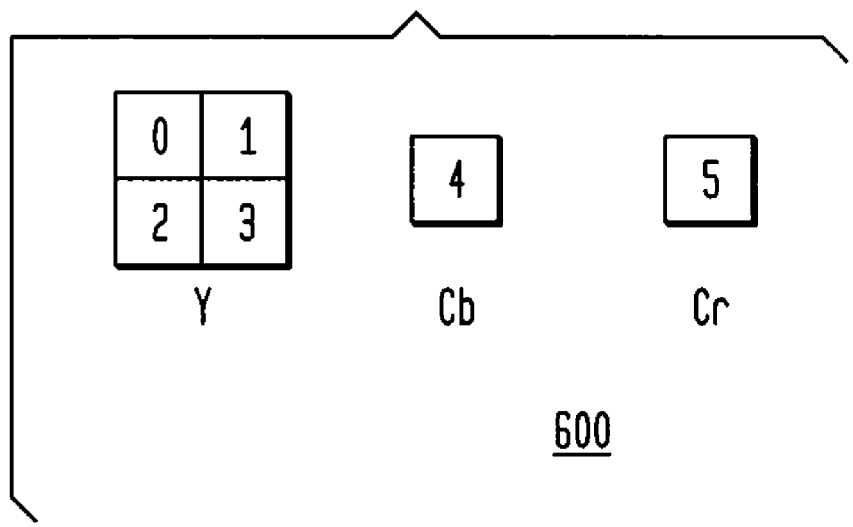
FIG. 6 is a diagram of a macroblock in accordance with one embodiment of the present invention.
FIG. 7 is a diagram of a DCT domain block in accordance with one embodiment of the present invention.

Referring now to FIG. 5, there is shown a flow chart illustrating another embodiment of a method for encoding noise in accordance with the present invention if the previous frame contained noise. The method illustrated in FIG. 5 encodes a frame as noise if the previous frame was determined to contain noise. More specifically, at step 502, the previous frame is evaluated to determine whether the previous frame contained noise. If the previous frame contained noise, then the current frame is assumed to contain noise at step 504. The noise in the frame may be encoded by using any high quantiser scale that achieves the target of reducing the peak bit rate. For example, in one embodiment, the noise in the frame may be encoded with the maximum quantiser scale value at step 506 to reduce the bit rate to a minimum. In a preferred embodiment, the present invention operates in accordance with the MPEG-2 standard and uses quantiser_scale=112 (quantiser_scale_code=31). Additionally, the high frequency diagonals in the block DCT domain are filtered at step 508 and only a predetermined number of consequent low frequency diagonals are retained. In a preferred embodiment, the present invention only keeps the first three (3) diagonals in the block DCT domain while the rest are set to zero as illustrated in FIG. 7. The present invention is not limited to the number of diagonals which are retained in the block DCT domain, and one skilled in the art will realize that any number of consequent low frequency diagonals may be retained as long as the bit rate is reasonable and the number of consequent low frequency diagonals retained does not halt the encoder. If the previous frame did not contain noise, then the current frame is assumed not to contain noise, and the frame is encoded at step 510 with the original bit rate algorithm of the encoder.

For clearer understanding of the principles of the present invention, it is helpful to understand the procedures applied to the macroblock within a frame. Referring now to FIG. 6, there is shown a diagram of a macroblock 600. Macroblock 600 contains a section of the luminance component and the spatially corresponding chrominance components. In general, there are three chrominance formats for a macroblock, namely, 4:2:0, 4:2:2 and 4:4:4 formats. The present invention may be used with all formats and in one embodiment, uses the 4:2:0 format. As shown in FIG. 6, a 4:2:0 macroblock consists of 6 blocks which hold 4 Y, 1 Cb and 1 Cr blocks with the block order as illustrated. The luminance component Y is used in calculating the variance.

Referring now to FIG. 7, there is shown a diagram of a DCT domain block 700. Block 700 is an 8-row by 8-column matrix of samples, or 64 DCT coefficients. In accordance with one embodiment, the present invention uses blocks 0 to 3 for the variance calculations and takes the minimum of these four variances. In the DCT domain, the DC is in the upper-left corner. The higher frequencies are gathered in the bottom-right area as represented by asterisks. To eliminate or reduce the peak bit rate caused by the noisy frame, the high frequency coefficients (DCT domain) are set to zero. The high frequencies are arranged in diagonals (as shown above by the asterisks placement).

In one embodiment, when there is nothing but noise in the frame, the first three (3) diagonals can be kept while the remaining diagonals are set to zero as illustrated in FIG. 7. The high DCT frequencies may be removed by using a DCT filter. The present invention is not limited to the number of diagonals which are retained or removed in the block DCT domain, and one skilled in the art will realize that any number of consequent low frequency diagonals may be retained as long as the bit rate is reasonable and the number of consequent low frequency diagonals retained does not halt the encoder. In general, the more high frequency diagonals in the block DCT domain that are removed, the lower the bit rate will be. One skilled in the art will also realize that the present invention is not limited to only filtering diagonals in the DCT domain, but that the principles of the present invention apply to any method for reducing the bit rate and maintaining a reasonable video quality. For example, the high frequency coefficients in the DCT domain may be filtered in any way that reduces the bit rate and maintains a reasonable video quality. Thus, this embodiment advantageously creates a very low bit rate which eliminates the peak and encoder halting. When encoding noise, the image quality is not a big issue.

In one embodiment, the Log2 of the variance can be calculated by right shifting the variance value by one again and again until zero is reached. The Log2 estimation is the number of times the variance value was right shifted to reach zero. In accordance with the present invention, it is possible to count from 1 or from 0. The value can be checked either before or after it is right shifted and may cause a different noise threshold value.

In a preferred embodiment of the present invention, the noise threshold is 45*30*10 for full-D1 resolution (720*480 pixels or 45*30 macroblocks per frame). One skilled in the art will realize that the general principles of the present invention are not limited to any specific noise threshold value, but that the noise threshold value may be changed depending on the encoder used and whether the frames are pre-processed. Pre-processing before calculating the variance may filter some noise resulting in a lower calculated variance.

In a preferred embodiment of the present invention, the noise threshold value is determined empirically. For example, different video sources to be encoded can be prepared. Preferably, these video sources have different levels of noise and frame complexities, such as video sources with high motion and many small details which cause high frequencies in the DCT domain. White noise sources generated by disconnected RF antenna or end of video tape and other noise generators are also used.

Each source is then encoded twice: once using the method of the present invention, and once without it. If the result achieved is a poor video quality in a noisy movie when using the method of the present invention, and a better result is achieved without using the method of the present invention, then the chosen noise threshold is too low. The noise threshold should be increased. If the result is a too high peak bit rate, then the chosen noise threshold is too high and is not filtering the high frequencies of the noise.

In another embodiment, the present invention may be used to encode RF broadcasting involving channel switching and broadcasting noise.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A digital video encoder, comprising:
a video input processor configured to receive a video signal, the video signal including a plurality of frames; and
a digital signal processor configured to determine whether a current macroblock from a plurality of macroblocks within a current frame of the plurality of frames contains noise, each macroblock including one or more luminance blocks and one or more chrominance blocks, the digital signal processor being further configured to:
(a) calculate a variance for each of the one or more luminance blocks within the current macroblock to provide a plurality of variances,
(b) determine a minimum variance from among the plurality of variances,
(c) calculate a Log2 of the minimum variance to provide a current Log2 calculation,
(d) combine the current Log2 calculation and one or more previous Log2 calculations to provide a running sum, the one or more previous Log2 calculations corresponding to one or more previous macroblocks from the plurality of macroblocks in the current frame,
(e) compare the running sum to a noise threshold to determine whether the current frame contains noise, and
(f) encode the current macroblock and one or more remaining macroblocks from the plurality of macroblocks as noise when the current frame contains noise.

2. The encoder of claim 1, wherein the digital signal processor is further configured to:
(g) assume the current frame contains noise if a previous frame contained noise.

3. The encoder of claim 1, wherein the digital signal processor is further configured to:
(g) filter high frequency coefficients in a DCT domain to reduce a bit rate when the running sum is greater than the noise threshold.

4. The encoder of claim 1, wherein the digital signal processor is further configured to:
(g) encode the current frame using quantiser scale=112 if the current frame contains noise.

5. The encoder of claim 1, wherein the digital signal processor is configured to encode radio frequency (RF) broadcasting involving channel switching and broadcasting noise.

6. The encoder of claim 1, wherein the digital signal processor comprises:
a DCT filter configured to remove at least one high DCT frequency from the current frame when the current frame contains noise.

7. The encoder of claim 1, wherein the digital signal processor is further configured to:
(g) set at least one high noise frequency in a DCT matrix to zero in the current frame when the current frame contains noise.

8. The encoder of claim 1, wherein the digital signal processor is further configured to:
(g) determine whether the current frame includes the one or more remaining macroblocks when the running sum is less than the noise threshold.

9. The encoder of claim 8, wherein the digital signal processor is further configured to:
(h) repeat (a) through (f) using at least one of the one or more remaining macroblocks to determine whether the current frame contains noise when the current frame includes the one or more remaining macroblocks.

10. The encoder of claim 8, wherein the digital signal processor is further configured to:
(h) determine the current frame does not contain noise when the current frame does not include the one or more remaining macroblocks when the running sum is less than the noise threshold.

11. The encoder of claim 1, wherein the digital signal processor is configured to calculate the variance of the one or more luminance blocks.

12. A digital video encoder configured to determine whether a current frame of a plurality of frames contains noise, the current frame including a plurality of macroblocks, each macroblock including one or more luminance blocks and one or more chrominance blocks, comprising:
a digital signal processor configured to:
(a) calculate a variance for each of the one or more luminance blocks within the macroblock to provide a plurality of variances,
(b) determine a minimum variance from the plurality of variances,
(c) calculate a Log2 of the minimum variance to provide a current Log2 calculation,
(d) combine the current Log2 calculation and one or more previous Log2 calculations to provide a running sum, the one or more previous Log2 calculations corresponding to one or more previous macroblocks from the plurality of macroblocks in the current frame,
(e) compare the running sum to a noise threshold to determine whether the current frame contains noise, and
(f) encode the current macroblock and one or more remaining macroblocks from among the plurality of macroblocks as noise when the current frame contains noise.

13. The encoder of claim 12, wherein the digital signal processor is further configured to
(g) filter high frequency coefficients in a DCT domain to reduce a bit rate when the current frame contains noise.

14. The encoder of claim 12, wherein the digital signal processor is configured to encode the current frame using quantiser scale=112 if the current frame contains noise.

15. The encoder of claim 12, wherein the digital signal processor is configured to encode radio frequency (RF) broadcasting involving channel switching and broadcasting noise.

16. The encoder of claim 12, wherein the digital signal processor comprises:
a DCT filter configured to remove at least one high DCT frequency from the current frame when the current frame contains noise.

17. The encoder of claim 12, wherein the digital signal processor is further configured to:
(g) set at least one high noise frequency in a DCT matrix to zero in the current frame when the current frame contains noise.

18. The encoder of claim 12, wherein the digital signal processor is further configured to:
(g) determine the current frame contains noise when the running sum is greater than the noise threshold.

19. The encoder of claim 12, wherein the digital signal processor is further configured to:
(g) determine whether the current frame includes the one or more remaining macroblocks when the running sum is less than the noise threshold.

20. The encoder of claim 19, wherein the digital signal processor is further configured:
(h) repeat (a) through (f) using at least one of the one or more remaining macroblocks to determine whether the current frame contains noise when the current frame includes the one or more remaining macroblocks.

21. The encoder of claim 19, wherein the digital signal processor is further configured to:
(h) determine the current frame does not contain noise when the current frame does not include the one or more remaining macroblocks when the running sum is less than the noise threshold.

22. The encoder of claim 12, wherein the digital signal processor is configured to calculate the variance of only the one or more luminance blocks.

23. A method for determining whether a current frame of a plurality of frames contains noise, the current frame including a plurality of macroblocks, each macroblock including one or more luminance blocks and one or more chrominance blocks, comprising:
(a) using a digital signal processor to calculate a variance for each of the one or more luminance blocks within a current macroblock to provide a plurality of variances;
(b) using the digital signal processor to determine a minimum variance from among the plurality of variances;
(c) using the digital signal processor to calculate a Log2 of the minimum variance to provide a current Log2 calculation;
(d) using the digital signal processor to combine the current Log2 calculation and one or more previous Log2 calculations to provide a running sum, the one or more previous Log2 calculations corresponding to one or more previous macroblocks from the plurality of macroblocks in the current frame;
(e) using the digital signal processor to compare the running sum to a noise threshold to determine whether the current frame contains the noise; and
(f) using the digital signal processor to encode the current macroblock and one or more remaining macroblocks from among the plurality of macroblocks as noise when the current frame contains noise.

24. The method of claim 23, further comprising:
(g) using the digital signal processor to filter high frequency coefficients in a DCT domain to reduce a bit rate when the current frame contains noise.

25. The method of claim 24, wherein step (g) comprises:
(g)(i) removing at least one high DCT frequency by using a DCT filter when the current frame contains noise.

26. The method of claim 24, wherein step (g) comprises:
(g)(i) setting at least one high noise frequency in a DCT matrix to zero when the current frame contains noise.

27. The method of claim 23, further comprising:
(g) using the digital signal processor to encode the current frame using quantiser scale=112 if the current frame contains noise.

28. The method of claim 23, further comprising:
(g) using the digital signal processor to determine the current frame contains the noise when the running sum is greater than the noise threshold.

29. The method of claim 23, further comprising:
(g) using the digital signal processor to determine whether the current frame includes the one or more remaining macroblocks when the running sum is less than the noise threshold.

30. The method of claim 29, further comprising:
(h) using the digital signal processor to repeat (a) through (f) using at least one of the one or more remaining macroblocks to determine whether the current frame contains noise when the current frame includes the one or more remaining macroblocks.

31. The method of claim 29, further comprising:
(h) using the digital signal processor to determine the current frame does not contain the noise when the current frame does not include the one or more remaining macroblocks when the running sum is less than the noise threshold.

32. The method of claim 23, wherein step (a) comprises:
(a)(i) using the digital signal processor to calculate the variance of only the one or more luminance blocks.

* * * * *